US007349955B1

(12) United States Patent
Korb et al.

(10) Patent No.: US 7,349,955 B1
(45) Date of Patent: Mar. 25, 2008

(54) METHOD OF AND SYSTEM FOR TRANSFERRING DATA OVER A WIRELESS COMMUNICATIONS NETWORK

(75) Inventors: Joseph Korb, Short Hills, NJ (US); Jesse Odom, New York, NY (US); David Rein, Flanders, NJ (US)

(73) Assignee: GoAmerica, Inc., Hackensack, NJ (US)

( * ) Notice: Subject to any disclaimer, the term of this patent is extended or adjusted under 35 U.S.C. 154(b) by 0 days.

(21) Appl. No.: 09/503,037

(22) Filed: Feb. 11, 2000

(51) Int. Cl.
*G06F 15/16* (2006.01)

(52) U.S. Cl. ............... 709/219; 709/227; 709/232

(58) Field of Classification Search ........ 709/217–219, 709/203, 246, 227–232; 455/418–419
See application file for complete search history.

(56) References Cited

U.S. PATENT DOCUMENTS

| | | | |
|---|---|---|---|
| 5,159,592 A * | 10/1992 | Perkins | 370/338 |
| 5,559,800 A * | 9/1996 | Mousseau et al. | 370/401 |
| 5,673,322 A | 9/1997 | Pepe et al. | |
| 5,920,701 A | 7/1999 | Miller et al. | |
| 6,049,826 A * | 4/2000 | Beser | 709/222 |
| 6,115,754 A | 9/2000 | Landgren | |
| 6,138,009 A | 10/2000 | Birgerson | |
| 6,167,441 A * | 12/2000 | Himmel | 709/217 |
| 6,173,316 B1 | 1/2001 | De Boor et al. | |
| 6,178,461 B1 | 1/2001 | Chan et al. | |
| 6,181,935 B1 | 1/2001 | Gossman et al. | |
| 6,182,125 B1 * | 1/2001 | Borella et al. | 709/218 |
| 6,185,535 B1 * | 2/2001 | Hedin et al. | 704/270 |
| 6,216,157 B1 * | 4/2001 | Vishwanath et al. | 709/208 |
| 6,253,326 B1 * | 6/2001 | Lincke et al. | 726/12 |
| 6,343,318 B1 * | 1/2002 | Hawkins et al. | 709/219 |
| 6,430,409 B1 * | 8/2002 | Rossmann | 455/422.1 |
| 6,453,160 B1 * | 9/2002 | Thomas et al. | 455/419 |
| 6,477,529 B1 * | 11/2002 | Mousseau et al. | 707/5 |
| 6,477,576 B2 * | 11/2002 | Angwin et al. | 709/226 |
| 6,480,711 B1 * | 11/2002 | Guedalia | 455/412.1 |

(Continued)

FOREIGN PATENT DOCUMENTS

| WO | WO 96/66673 | 12/1999 |
|---|---|---|
| WO | WO 99/61984 | 12/1999 |

OTHER PUBLICATIONS

Fox et al. "Reducing WWW Latency and Bandwidth Reuriements by Real-Time Distillation" 5th International World Wide Web Conference © 1996.*

(Continued)

*Primary Examiner*—Joseph E. Avellino
(74) *Attorney, Agent, or Firm*—Winston & Strawn LLP

(57) ABSTRACT

A method of and system for transferring data over a wireless communications network are provided. A wireless device user desiring to browse a World-Wide-Web page or other data sends a request over the wireless network to a Web server. The Web server receives the request and transmits the request over the Internet to the destination server containing the desired Web page. The destination server receives the request and returns the requested Web page to the Web server. The Web server parses the Web page to remove data that is not displayable on the wireless device and transmits the parsed Web page over the wireless network to the wireless device for display to the user.

30 Claims, 5 Drawing Sheets

U.S. PATENT DOCUMENTS

| | | | |
|---|---|---|---|
| 6,493,758 B1* | 12/2002 | McLain | 709/227 |
| 6,529,936 B1* | 3/2003 | Mayo et al. | 709/202 |
| 6,574,242 B1* | 6/2003 | Keenan et al. | 370/474 |
| 6,578,069 B1* | 6/2003 | Hopmann et al. | 709/203 |
| 6,594,707 B1* | 7/2003 | Rubinstein et al. | 709/250 |
| 6,615,239 B1* | 9/2003 | Berstis | 709/204 |
| 6,625,447 B1* | 9/2003 | Rossmann | 455/426.1 |
| 6,662,224 B1* | 12/2003 | Angwin et al. | 709/224 |
| 6,674,767 B1* | 1/2004 | Kadyk et al. | 370/466 |
| 6,675,196 B1* | 1/2004 | Kronz | 709/203 |
| 6,785,730 B1* | 8/2004 | Taylor | 709/230 |
| 6,889,246 B1* | 5/2005 | Kawamoto et al. | 709/204 |
| 6,973,475 B2* | 12/2005 | Kenyon et al. | 709/203 |
| 7,218,736 B1* | 5/2007 | Nishimura et al. | 380/201 |
| 2002/0059344 A1* | 5/2002 | Britton et al. | 707/513 |
| 2002/0059405 A1* | 5/2002 | Angwin et al. | 709/223 |
| 2003/0067940 A1* | 4/2003 | Edholm | 370/468 |
| 2003/0105821 A1* | 6/2003 | Shah et al. | 709/206 |

OTHER PUBLICATIONS

Brooks et al. "Application-Specific Proxy Servers as HTTP Stream Transducers" 4th International World Wide Web Conference © 1995.*

Fox, Armando et al., 1996, "Adapting to Network and Client Variability via On-Demand Dynamic Distillation", ASPLOS VII, pp. 160-170.

Bickmore, Timothy W. et al., 1997, "Digestor: device-independent access to the World Wide Web", Computer Networks and ISDN Systems 29, pp. 1075-1082.

1997, "Spyglass Prism", Concepts and Applications, pp. 1-8.

Freytag, C. et al., 1999, "Resource adaptive WWW access for mobile applications", Computers & Graphics 23, pp. 841-848.

Wei-Ying, Ma et al., 2000, "A Framework for Adaptive Content Delivery in Heterogeneous Network Environments", Hewlett-Packard Laboratories, pp. 1-14.

* cited by examiner

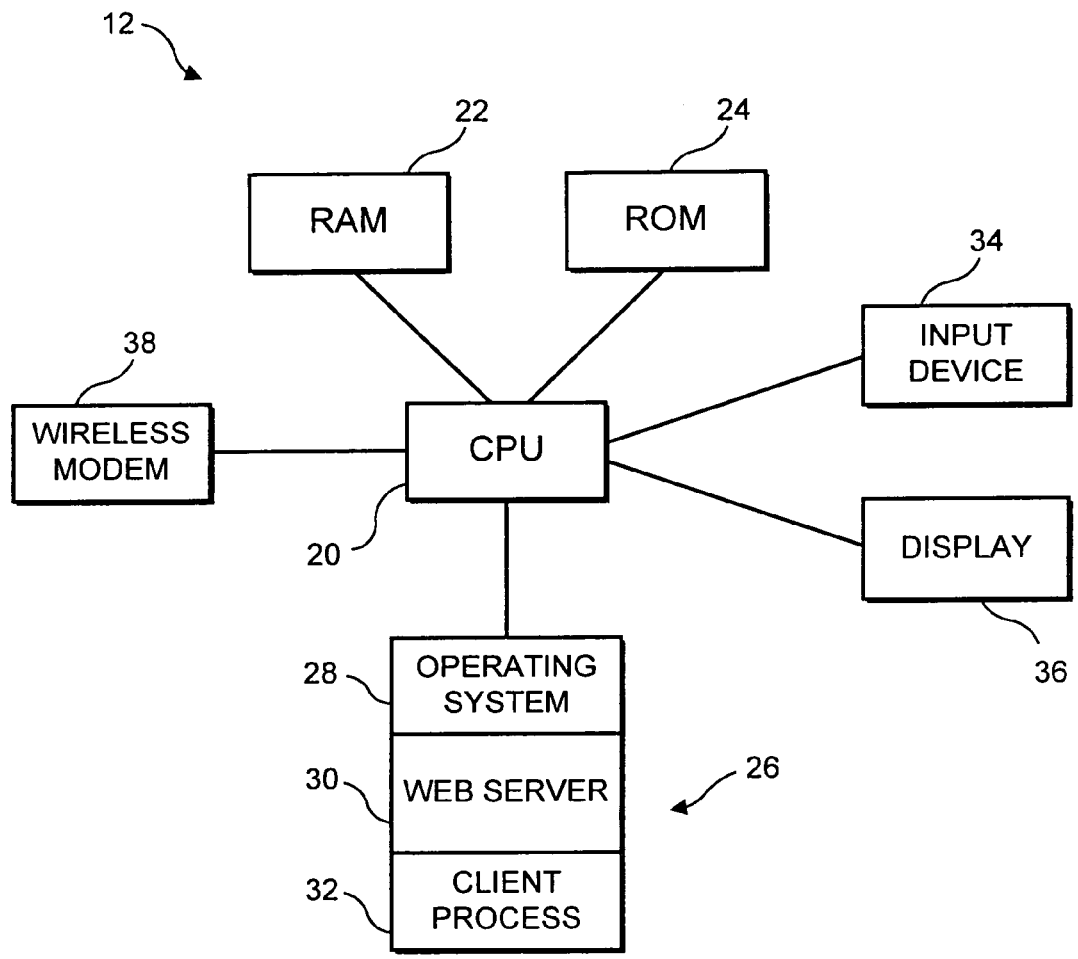
F I G. 2

METHOD OF AND SYSTEM FOR TRANSFERRING DATA OVER A WIRELESS COMMUNICATIONS NETWORK

BACKGROUND OF THE INVENTION

1. Field of the Invention

The present invention relates to an improved method of and system for transferring data over a wireless communications network. More particularly, the present invention relates to an improved method of and system for transferring data from the Internet to wireless devices.

2. Description of the Prior Art

The Internet is a global computer network which comprises a vast number of computers and computer networks interconnected through communication links. The interconnected computers exchange information using various services, such as electronic mail and the World-Wide-Web (hereinafter, the "WWW").

The present invention relates particularly to the WWW portion of the Internet. The WWW allows a Web server to send graphical Web pages of information to a remote client computer system. The remote client computer system then displays the Web pages. Each Web page of the WWW is uniquely identifiable by a Uniform Resource Locator (URL). To view a specific Web page, a client computer system specifies the URL for that Web page in a request (e.g., a HyperText Transfer Protocol ("HTTP") request). The request is forwarded to the Web server that supports that Web page. When the Web server receives the request, it sends the Web page to the client computer system. When the client computer system receives the Web page, it typically displays the Web page using a browser. A browser is a special-purpose application program that effects the requesting of Web pages and the displaying of Web pages. Commercially available browsers include Microsoft Internet Explorer™ and Netscape Navigator™.

Web pages are typically defined using HyperText Markup Language ("HTML"). HTML provides a standard set of tags that define how a Web page is to be displayed. When a user instructs the browser to display a Web page, the browser sends a request to the Web server to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other Web servers. Today, thousands of individuals, companies, educational institutions, government agencies and other organizations maintain Web sites which may be accessed and browsed through the use of a Web browser.

Typically, users will access the Internet via telephone lines or high speed data transmission lines hardwired to their computers. However, an expanding area of Internet access is wide-area wireless communications networks. Numerous companies throughout the United States, including Sprint and AT&T, offer their customers wireless Internet access via wireless devices such cellular phones, pagers, personal digital assistants (PDAs), etc.

However, because wireless communications networks have relatively low bandwidths as compared to other types of communications networks, and because most wireless devices have very limited capabilities with respect to the displaying of graphical images, the transmission of graphics-intensive Internet documents in the wireless Internet context has generally proven unsatisfactory in that data transmission is often extremely slow and highly inefficient.

Additionally, in typical prior art systems, Internet documents are transmitted over wireless communications networks to the wireless devices without regard to the type of wireless communications networks to which the wireless devices are connected. Different types of wireless devices will transmit and receive data over different types of wireless communications networks. For example, one popular wireless communications network is the Mobitex network operated by Bell South Wireless Data in the United States. The Mobitex network is a packet data network that uses a proprietary non-IP packet format that must be converted to IP (Internet Protocol) for transmission over IP based networks. In addition, because of the low bandwidth of the Mobitex network, in order to achieve maximum performance, the packets should be paced over the network at an appropriate speed based on the capabilities of the network. By doing so, the waste and performance degradation associated with sending packets too quickly over the network is avoided, reducing both latency and financial loss to the Internet service provider caused by lost packets. Thus, data transmission without regard to wireless communications network type introduces additional delays and inefficiencies.

It is thus clear that there is a need for an improved method of and system for transferring data from the Internet to wireless devices which overcomes the problems associated with the prior art.

SUMMARY OF THE INVENTION

Accordingly, it is an object of the present invention to provide a new method of and system for transferring data from the Internet to wireless devices which overcomes the problems associated with the prior art. It is another object of the present invention to provide a new method of and system for transferring data from the Internet to wireless devices wherein data transmission occurs at higher speeds than in the prior art. It is yet another object of the present invention to provide a new method of and system for transferring data from the Internet to wireless devices wherein data transmission is more efficient than in the prior art. It is yet another object of the present invention to provide a new method of and system for transferring data from the Internet to wireless devices wherein data transmission is informed by the type of wireless communications network to which the wireless device is connected. Additional objects will become apparent from the following discussion.

In accordance with the present invention, a client wireless device running a client process and a Web server running a server process are provided. The wireless device and Web server are configured so that the wireless device user may access the Internet or other communications network (either public or private) over a wireless communications network through the Web server.

A wireless device user desiring to browse a Web page will send a request over the wireless communications network to the Web server via the client process using a transport protocol suitable for transmission over a low bandwidth network. The protocol includes an element which identifies the type of wireless device making the request and the type of wireless communications network to which the wireless device is connected. The Web server receives the request from the wireless device, reformats the request into a fully qualified HTTP request suitable for transmission over the Internet, and transmits the reformatted request over the Internet to the destination server containing the desired Web page. The destination server receives the request and returns the requested Web page to the Web server. As the Web page is received by the Web server, the server process parses the Web page to remove data that is not displayable on the wireless device based on the wireless device type. The parsed Web page is then transmitted over the wireless network in data packets to the wireless device where it is displayed for the user. Packet pacing is determined by the wireless network type.

The present invention will now be described in greater detail, with frequent reference being made to the drawings identified below.

BRIEF DESCRIPTION OF THE DRAWINGS

In the accompanying drawings:

FIG. 2 is a block diagram of a wireless device in accordance with an embodiment of the present invention;

DETAILED DESCRIPTION OF THE PREFERRED EMBODIMENT

The following description is presented to enable any person of ordinary skill in the art to make and use the present invention. Various modifications to the preferred embodiment will be readily apparent to those of ordinary skill in the art, and the principles defined herein may be applied to other embodiments and applications without departing from the spirit and scope of the present invention. Thus, the present invention is not intended to be limited to the embodiment shown, but is to be accorded the broadest scope consistent with the principles and features disclosed herein.

Figure 1:
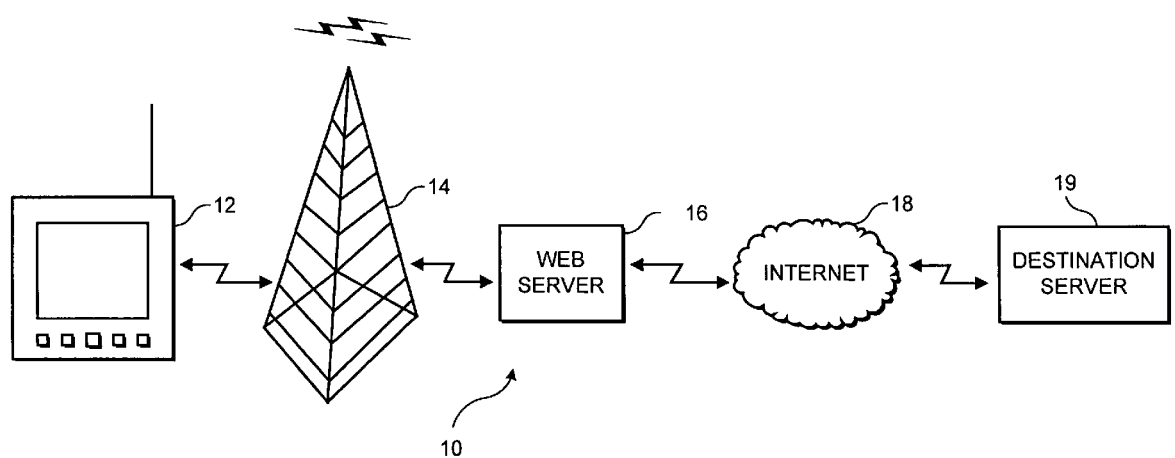
FIG. 1 is a schematic diagram of a system for wireless Internet access in accordance with an embodiment of the present invention.

Referring to FIG. 1, a system 10 for wireless Internet access is shown. The system 10 includes a wireless device 12, such as a cellular phone, pager, PDA, laptop computer, or the like, which a user may use to access the Internet 18; a wireless communications network 14; a Web server 16 connected to the wireless device 12 via the wireless communications network 14 as well as the Internet 18; and a destination server 19 on the Internet from where a Web page will be retrieved and send to the wireless device for display.

It will be readily apparent to those of ordinary skill in the art that although the present discussion focuses on the Internet, the present invention is not limited to the Internet, but may be used in connection with any private or public IP or non-IP communications network.

Referring to FIG. 2, a block diagram of a typical wireless device 12 in accordance with the present invention is shown. The wireless device 12 includes a central-processing-unit (CPU) 20 for controlling the operation of the device; a random-access-memory (RAM) 22; a read-only-memory (ROM) 24; a hard drive 26 which includes an operating system 28, a Web browser 30 and a client process 32; an input device 34, such as a keyboard; a display 36, such as liquid-crystal-display (LCD); and a wireless modem 38 for interfacing with the wireless communications network 14.

Figure 3:
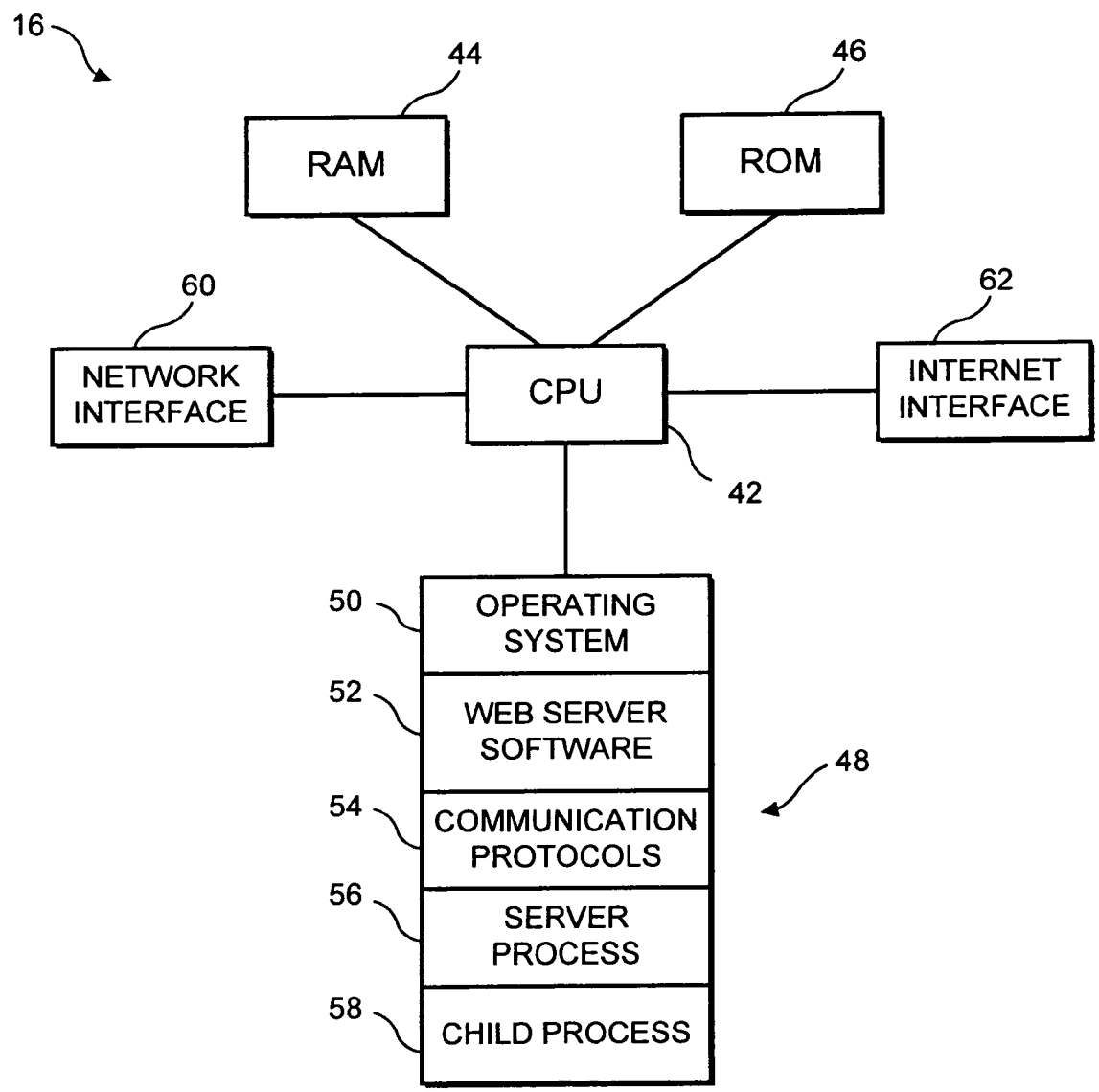
FIG. 3 is a block diagram of a Web server in accordance with an embodiment of the present invention.

Referring to FIG. 3, a block diagram of a typical Web server 16 in accordance with the present invention is shown. The Web server includes a CPU 42; a RAM 44; a ROM 46; a hard drive 48 which includes an operating system 50, Web server software 52, communications protocols 54, a server process 56 and a child process 58; a network interface 60 which connects the Web server 16 to the wireless communications network 14; and an Internet interface 62 which connects the Web server 16 to the Internet 18.

Figure 4:
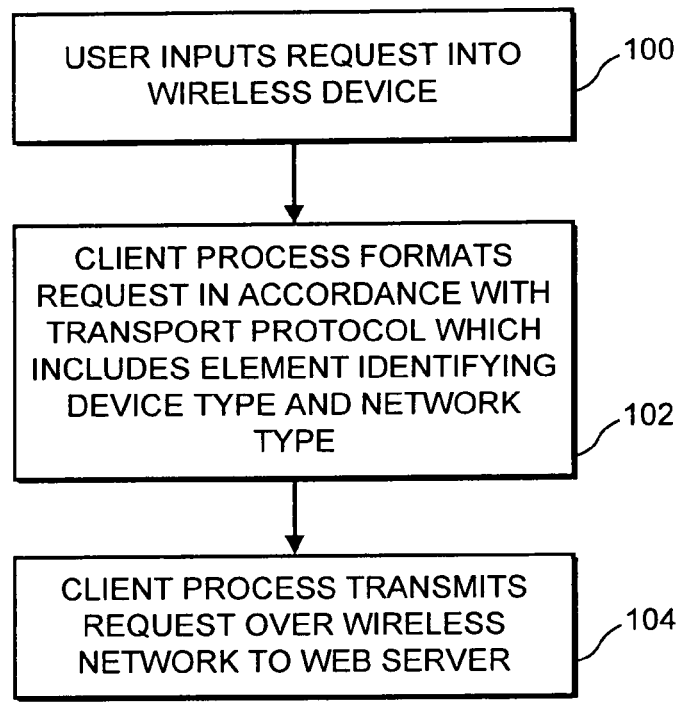
FIG. 4 is a flow chart showing how a request is transmitted from the wireless device to the Web server in accordance with an embodiment of the present invention.

The operation of the system of FIG. 1 will now be described. Referring to FIG. 4, the user of the wireless device 12 will input a request into the Web browser 30 using the input device 34 (step 100). The request will typically consist of a URL for a Web page of interest of the user, but may be any type of request for any type of data. After the request is input, the client process 32 will format the request in accordance with a transport protocol suitable for transmission over a wireless communications network, such as one based on UDP/IP (step 102). Importantly, the transport protocol includes an element which identifies the type of wireless device making the request and the type of wireless communications network over which the request is being transmitted. The request is then transmitted over the wireless communications network 14 to the Web server 16 (step 104).

Figure 5:
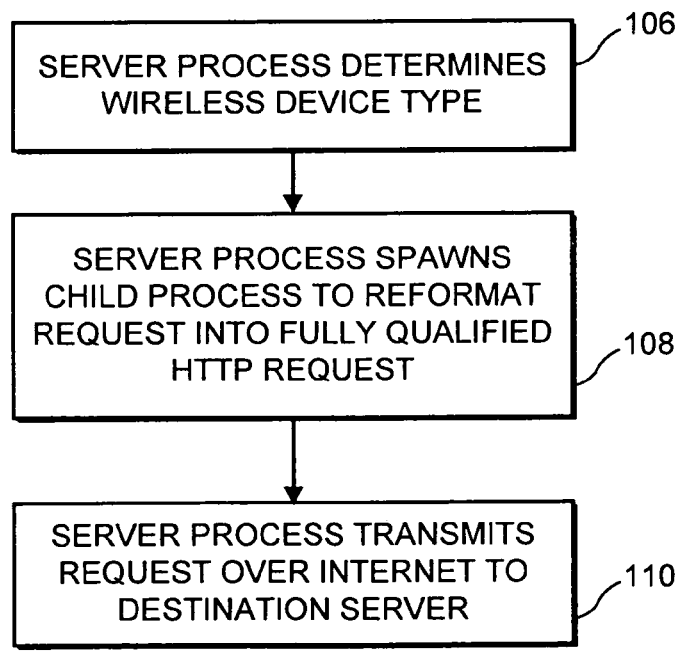
FIG. 5 is a flow chart showing how the request is processed by the Web server in accordance with an embodiment of the present invention.

Referring to FIG. 5, upon receipt of the request by the Web server 18, the server process 56 first determines the type of device that has made the request (step 106). Once that determination is made, the server process 56 spawns the child process 58 which reformats the request into a fully qualified HTTP request suitable for transmission over the Internet (step 108). After reformatting the request, the server process 56 transmits the HTTP request over the Internet to the destination server 19 (step 110).

Figure 6:
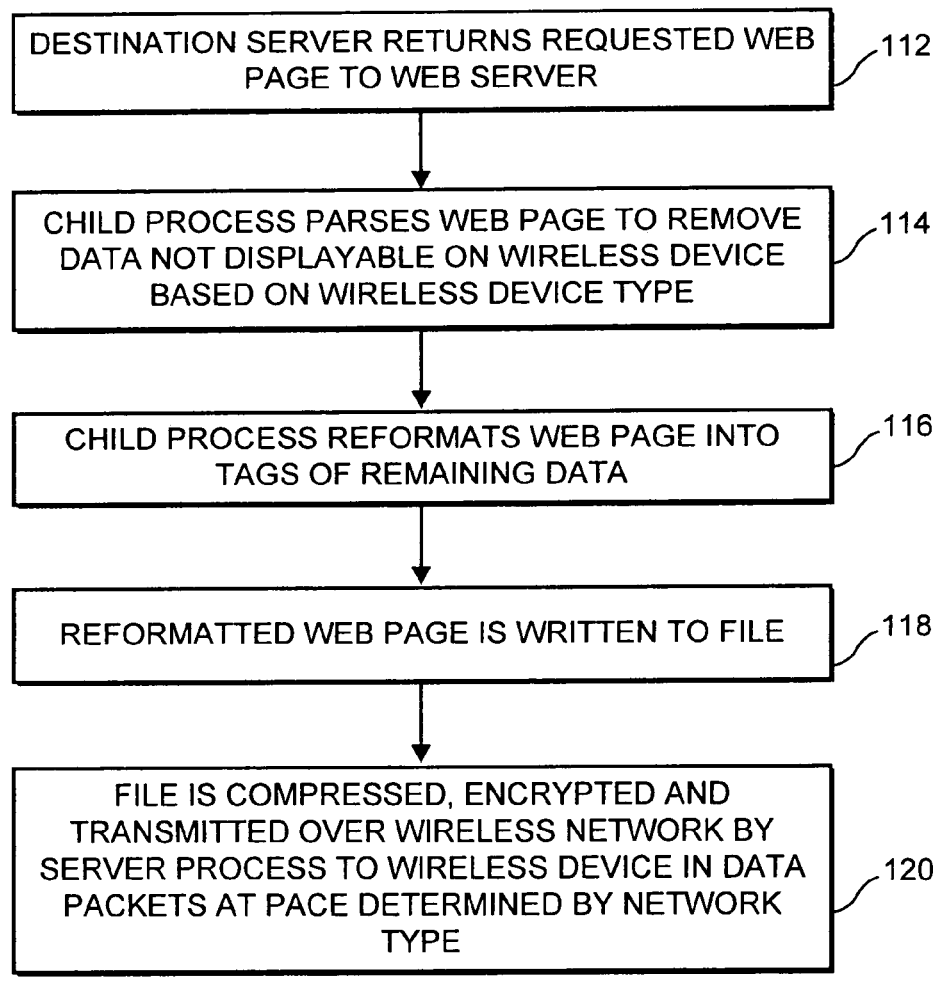
FIG. 6 is a flow chart showing how the requested Web page retrieved from the Internet is processed by the Web server in accordance with an embodiment the present invention.

Referring to FIG. 6, upon receipt of the request from the Web server 18, the destination server 19 returns the requested Web page to the Web server 18 (step 112). Typically, the requested Web page will be in HTML or other popular Internet format. As the Web server 18 receives the Web page, the child process 58 parses the Web page to remove any data that is not displayable on the wireless device 12 (step 114). The data that are removed from the Web page are dependent upon the wireless device type. Thus, for example, if the device is a pager that is not capable of displaying JPG files, then any JPG files will be removed.

After parsing, the child process 58 reformats the Web page by building tags containing the remaining data (step 116). Preferably, the tag language used will be HTML since HTML is the most well-known and popular Internet tag language. However, those of ordinary skill in the art will realize that browsers on some wireless devices, such as pagers and PDAs, may not be capable of displaying HTML documents. In that case, a tag language compatible with the particular browser must be used.

The reformatted Web page is then written to a file and stored in RAM 44 or on the hard drive 48 (step 118). After that, the file is compressed, encrypted and transmitted over the wireless communications network 14 for delivery to the wireless device 12 by the server process (step 120) in data packets. Because the type of wireless network to which the wireless device is connected is known, the data packets are paced by the server process at a rate best suited for transmission over the particular type of network.

Figure 7:
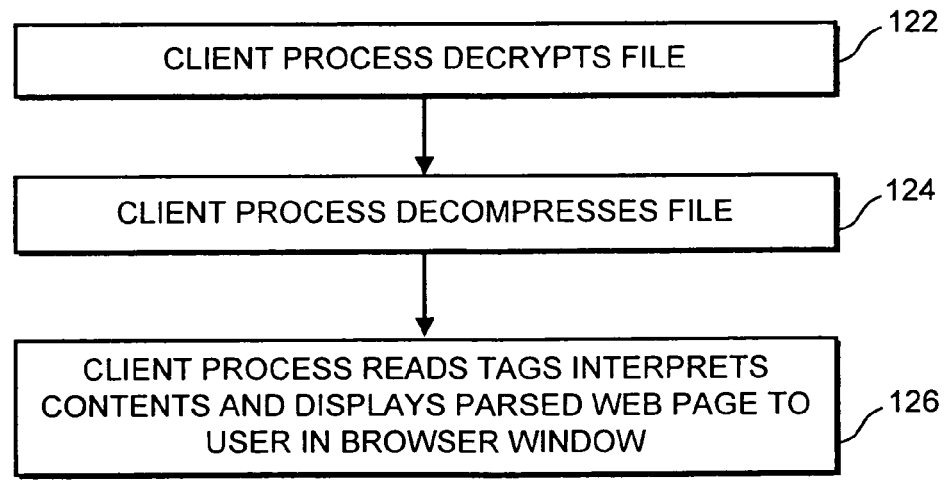
FIG. 7 is a flow chart showing how the requested Web page is processed by the wireless device for display in accordance with an embodiment of the present invention.

Referring to FIG. 7, once the file is received by the wireless device 12, the client process 32 first decrypts (step 122) and then decompresses (step 124) the file. The client process 32 then reads the tags of decompressed, decrypted data, interprets their contents, and displays the parsed Web page to the user in the browser 30 window on the display 36 (step 126).

The present invention has numerous advantages over the prior art. Because the Web page transmitted to the wireless device is greatly simplified from its original form, the size of the Web page is greatly reduced, resulting in a reduced transmission time over the wireless communications network. Additionally, because the Web page transmitted to the wireless device does not have any non-displayable elements, the transfer is extremely efficient since there is no transmission of superfluous data. Additionally, because the type of wireless communications network is known to the Web server 18, it is possible to pace the data packets at an optimal rate to provide a faster and more efficient data transfer.

It will be apparent to those of ordinary skill in the art that the present invention may readily implemented using computer programming techniques well known to those of ordinary skill in the art. It will be further apparent to those of ordinary skill in the art that the present invention is extremely versatile and may be modified and used in a virtually unlimited number of ways without departing from the scope of the claims attached hereto.

Thus, in accordance with the foregoing the objects of the present invention are achieved. While modifications to the present invention may be obvious to those of ordinary skill in the art, the invention so modified would not be beyond the scope of the appended claims.

What is claimed is:

1. A web server for transferring data from the Internet to mobile wireless devices that have limited display capabilities, comprising:
   a web server that is connected to wireless devices via one or more corresponding wireless communications networks of the wireless devices, and is also connected to the Internet, and
   wherein the web server is further configured to
      receive requests from users of the wireless devices to view Internet web pages, wherein the requests, which are formatted in a transport protocol by a requesting wireless device to be suitable for transmission over its corresponding wireless communication network, are received by the web server in accordance with that transport protocol, wherein the transport protocol inserts an element that identifies the type of wireless device that is making the request,
      reformat the requests into HTTP requests,
      send the HTTP requests to destination servers on the Internet in accordance with an Internet transport protocol,
      receive the requested web pages from the destination servers,
      pause data elements contained in the received web pages and remove non-displayable data elements from the web pages to generate displayable web pages based on the wireless device type of the requesting wireless device, and
      send the web pages, without including the removed data elements, over the wireless communications networks to the requesting wireless device.

2. The web server of claim 1 wherein the web server is configured to receive a request for an Internet web page that is sent in accordance with the transport protocol that includes the wireless device type.

3. The web server of claim 1 wherein the web server determines the wireless device type to be the type of device identified in the transport protocol.

4. The web server of claim 3 wherein the web server comprises a server process and a child process wherein the child process reformats the requests into HTTP requests.

5. The web server of claim 4 wherein the child process parses data elements contained in the received web pages and removes non-displayable data elements from the web pages.

6. The web server of claim 5 wherein the child process reformats a requested web page by building tags containing remaining data elements.

7. The web server of claim 1 wherein the web server compresses and encrypts the web pages after the web server parses and removes non-displayable data elements from the web pages.

8. The web server of claim 1 wherein the web server is configured to generate a plurality of data packets for sending the data elements of a particular web page to a requesting wireless device.

9. The web server of claim 8 wherein the web server is configured to send that particular web page by pacing the transmission of the data packets from the web server to the requesting wireless device.

10. The web server of claim 9 wherein the pacing is performed based on a bandwidth capability of a corresponding wireless communications network on which the requesting wireless device is operating.

11. The web server of claim 1 wherein the web server is configured to convert the web pages from HTML to another tag language.

12. The web server of claim 1 wherein the web server receives a wireless network type as part of the transport protocol.

13. A system comprising the web server of claim 1 and a client process implemented on the wireless devices, wherein the client sends the requests to the web server in accordance with the transport protocol of the corresponding wireless communications network in which the wireless device is configured to operate.

14. The system of claim 13 wherein the transport protocol is for low bandwidth networks.

15. A system comprising the web server of claim 1 and one or more browser applications implemented on the wireless devices that allows users to input a URL of a web page of interest to the user as their request.

16. A method for transferring data from the Internet to mobile wireless devices that have limited display capabilities, comprising:
   connecting a web server to wireless devices via one or more corresponding wireless communications networks of the wireless devices, and also connecting the web server to the Internet;
   receiving requests from users of the wireless devices to view Internet web pages, wherein the requests, which are formatted in a transport protocol by a requesting wireless device to be suitable for transmission over its corresponding wireless communication network, are received in accordance with a transport protocol used by a requesting wireless device in its corresponding wireless communications network, wherein the transport protocol inserts an element that identifies the type of wireless device that is making the request, reformatting the requests into HTTP requests, sending the HTTP requests to destination servers on the Internet in accordance with an Internet transport protocol, receiving the requested web pages from the destination servers, parsing data elements contained in the received web pages and removing non-displayable data elements from the web pages to generate displayable web pages based on the wireless device type of the requesting wireless device, and sending the web pages, without including the removed data elements, over the wireless communications networks to the requesting wireless devices.

17. The method of claim 16 wherein receiving requests comprises receiving a request for an Internet web page that is sent in accordance with the transport protocol that includes the wireless device type.

18. The method of claim 16 comprising determining the wireless device type to be the type of device identified in the transport protocol.

19. The method of claim 18 further comprising implementing a server process and a child process on the webs server, wherein the child process reformats the requests into HTTP requests.

20. The method of claim 19 wherein the child process parses data elements contained in the received web pages and removes non-displayable data elements from the web pages.

21. The method of claim 20 wherein the child process reformats a requested web page by building tags containing remaining data elements.

22. The method of claim 16 further comprising compressing and encrypting the web pages after parsing and removing non-displayable data elements from the web pages.

23. The method of claim 16 further comprising generating a plurality of data packets for sending the data elements of a particular web page to a requesting wireless device.

24. The method of claim 23 further comprising sending that particular web page by pacing the transmission of the data packets from the web server to the requesting wireless device.

25. The method of claim 24 wherein the pacing is performed based on a bandwidth capability of a corresponding wireless communications network on which the requesting wireless device is operating.

26. The method of claim 16 wherein the web server is configured to convert the web pages from HTML to another tag language.

27. The method of claim 16 wherein the web server receives a wireless network type as part of the transport protocol.

28. The method of claim 16 further comprising implementing a client process on the wireless devices, wherein the client process sends the requests to the web server in accordance with the transport protocol of the corresponding wireless communications network in which that wireless device is configured to operate.

29. The method of claim 28 wherein the transport protocol is for low bandwidth networks.

30. The method of claim 16 wherein the receiving comprises implementing one or more browser applications on the wireless devices that allows the users to input a URL of web page of interest to the user as their request.

* * * * *

UNITED STATES PATENT AND TRADEMARK OFFICE
CERTIFICATE OF CORRECTION

PATENT NO. : 7,349,955 B1 Page 1 of 1
APPLICATION NO. : 09/503037
DATED : March 25, 2008
INVENTOR(S) : Korb et al.

It is certified that error appears in the above-identified patent and that said Letters Patent is hereby corrected as shown below:

Column 5:
Line 54 (claim 1, line 18), change "IITTP" to -- HTTP --.
Line 60 (claim 1, line 24), change "pause" to -- parse --.

Column 6:
Line 42 (claim 13, line 3), after "the client" insert -- process --.

Signed and Sealed this

Twenty-sixth Day of August, 2008

JON W. DUDAS
*Director of the United States Patent and Trademark Office*